United States Patent [19]

Dahlen et al.

[11] 3,787,321

[45] Jan. 22, 1974

[54] CALIFORNIUM-PALLADIUM METAL NEUTRON SOURCE MATERIAL

[75] Inventors: Burton L. Dahlen, Aiken; Wilbur C. Mosly, Jr., New Ellenton; Paul K. Smith; Edward L. Albenesius, both of Aiken, all of S.C.

[73] Assignee: The United States of America as represented by the United States Atomic Energy Commission, Washington, D.C.

[22] Filed: July 1, 1971

[21] Appl. No.: 158,999

[52] U.S. Cl............ 252/301.1 R, 423/250, 264/0.5, 250/499
[51] Int. Cl............................................ C01g 56/00
[58] Field of Search............ 250/106 R, 106 S, 499; 252/301.1 R; 423/3, 250; 264/0.5

[56] References Cited
UNITED STATES PATENTS

| 3,627,691 | 12/1971 | Boulogne et al. | 252/301.1 R |
|---|---|---|---|
| 3,640,888 | 2/1972 | Baybarz et al. | 252/301.1 R |
| 3,640,887 | 2/1972 | Anderson | 252/301.1 R |
| 3,567,943 | 3/1971 | Wallhausen et al. | 250/106 S |
| 3,488,502 | 1/1970 | Dukes | 250/106 S |
| 3,655,984 | 4/1972 | Dukes | 250/106 S |
| 3,368,979 | 2/1968 | Robkin et al. | 252/301.1 R |

OTHER PUBLICATIONS

J. L. Crandall, "Survey of Applications for Cf...," April 15, 1970, Nuclear Science Abstracts – Vol. 24 (No. 11742)

J. A. Smith, "Large Scale Production of Cf...", August, 1969, Nuclear Science Abstracts – Vol. 23, No. 16, (No. 31362)

McDonnell et al., "Prep. of Industrial Cf Neutron Sources..." Nov. 15, 1971, (April 18, 1971), Nuclear Science Abstracts, Vol. 25, (No. 50600)

Kok et al., "Effects on Source Encapsulation Mat'ls...", Nov. 15, 1971, (April 18, 1971), Nuclear Science Abstracts, Vol. 25 (No. 50601).

Primary Examiner—Benjamin R. Padgett
Assistant Examiner—Roger S. Gaither
Attorney, Agent, or Firm—John A. Horan

[57] ABSTRACT

Californium, as metal or oxide, is uniformly dispersed throughout a noble metal matrix, provided in compact, rod or wire form. A solution of californium values is added to palladium metal powder, dried, blended and pressed into a compact having a uniform distribution of californium. The californium values are decomposed to californium oxide or metal by heating in an inert or reducing atmosphere. Sintering the compact to a high density closes the matrix around the dispersed californium. The sintered compact is then mechanically shaped into an elongated rod or wire form.

4 Claims, No Drawings

CALIFORNIUM-PALLADIUM METAL NEUTRON SOURCE MATERIAL

BACKGROUND OF THE INVENTION

The present invention was made in the course of, or under, a contract with the United States Atomic Energy Commission.

1. Field of the Invention

The present invention relates to radiation source materials, particularly those including rate and expensive radioisotopes such as californium-252. The spontaneous fission of Californium-252 provides a substantial neutron flux but this element is extremely difficult and expensive to produce and fabricate. This element is produced by the long and costly procedure of successive nuetron capture in nuclear reactors, beginning with, for instance, uranium-238. Handling this radioscope is both difficult and hazaradous due to neutron and alpha emissions. Consequently, californium-252 must be provided in a form that can be conveniently and safely allotted into precise micograms and milligram quantities for encapsulation as a neutron source with a minimum of waste and process loss.

2. Description of Prior Art

Prior neutron source materials have included salts of radioisotopes in solution, in precipitate or oxide form. Californium-252 can be transferred or stored in an acidic aqueous solution of californium nitrate, as a californium oxlate precipitate, perhaps including a carrier metal oxalate, or as californium oxide or oxysulfate obtained by calcining an ion exchange resin containing californium ions. The allocation of californium material in any of these forms into precise quantities followed by encapsulation to a form usable as neutron sources can be a difficult process if losses are held to an extremely small level as required. Moreover, inconvenient wet chemistry procedures may be required in the encapsulation of californium neutron sources from these prior art material forms. For example see SRO-153 "Guide for Fabricating and Handling $^{252}$Cf Sources" pp. 43–59, 1971, available from National Technical Information Service, U.S. Department of Commerce.

SUMMARY OF THE INVENTION

Therefore, it is an object of the present invention to provide a radiation source material that can be conveniently allocated into radiation sources of precise quantity.

It is a further object to provide a californium-252 neutron source material that can be easily produced and encapsulated into usable neutron sources with minimal loss of the radioisotope.

It is also an object of the present invention to provide a method of preparing a californium-252 neutron source material with negligible loss of californium and low risk of radioactive contamination.

In accordance with the present invention there is provided a californium-noble metal neutron source material including a palladium metal matrix with californium-252 uniformly dispersed throughout said matrix. A solution containing californium-252 values is admixed with palladium metal powder and pressed into a compact. The compact is sintered at an elevated temperature to increase its density and incorporate the californium into the palladium metal matrix.

DETAILED DESCRIPTION OF THE PREFERRED EMBODIMENT

In neutron the neutraon source material of the present invention an acidic aqueous solution containing californium-252 values is blended into a palladium metal powder. Californium is readily soluble in dilute nitric acid but most noble metals are not appreciably attacked by a dilute solution of this acid. A dilute concentration of formic acid is also included to break down the nitric acid before a concentrated acid solution is formed in the subsequent evaporation step, thus preventing reaction of the concentrated nitric acid and noble metal.

Noble metal powders including palladium, platinum, ruthenium, rhodium, silver, osmium, iridium, and gold are suitable raw materials for forming a matrix in some applications of the present developement. It has been found that palladium is a preferred matrix material since it not only resists oxidation but has a high melting point (1,552° C), alloys readily with californium and other elements, is ductile, dissolves in concentrated nitric acid for subsequent recovery of the californium, gives little gamma interference on neutron activation, and is less expensive than many other noble metals.

The solution can be incrementally added to the powder and evaporated after each addition to leave a coating or residual of californium-252 values. The powder and californium values are thoroughly mixed by conventional stirring means after drying to avoid splattering that often occurs in wet mixing. The uniform mixture of californium and noble metal powder is cold pressed at a sufficient pressure to form an integral compact of any desired shape.

Californium present in the compact as $Cf(NO_3)_3$ can be decomposed into $Cf_2O_3$ by heating in an inert or slightly reducing atmosphere. Decomposition is accomplished at a lower temperature than that employed in the subsequent sintering step to limit volatilization of uncombined californium. Californium oxide is a nonvolatile ceramic-like compound that is predicted to melt at about 2,300° C. Consequently, this stable form of californium is particularly well suited for dispersion within a matrix material because both loss of the scarce radioisotope and contamination are minimized.

The compact is next sintered to a high density at an elevated temperature within an inert gas atmosphere. This closes the matrix around the uniformly dispersed californium oxide and further prevents its loss.

Alternatively, the compact can be heated at 1,300° C to 1,400° C in a reducing atmosphere of hydrogen gas to form a high density alloy of californium with the noble metal matrix material by coupled reduction. This method avoids the higher temperatures required to effect alloying in other reduction processes with accompanying increased californium vapor loss. It is expected that the solid solubility of californium in palladium is at least 10 atom percent. If the said solubility is exceeded, californium-noble metal compounds may be formed and uniformly distributed within the matrix material. Since californium in alloy form will be bound within the matrix material at the atomic level, an intimately bound distribution is ensured and the potential for volatilization of californium and radioactive contamination is reduced.

If the heated or sintered matrix material contains the desired amount of californium-252 for a particular neutron source, it can be encapsulated and prepared for use. Otherwise, the material is mechanically shaped into an elongated configuration, such as a rod or a wire, of any desired cross section. To prevent contamination of the shaping device, the matrix material is sealed within an elongated sheath of noble metal that snugly fits around the material at the diameter. Space at both ends of the sheath is provided to allow the material to be readily elongated. Conventional extrusion, swaging, rolling and drawing techniques can be employed to shape the enclosed matrix material into an elongated member having a noble metal cladding and a uniform dispersion of californium-252 along its length. These techniques may be employed separately or in concert in several reduction steps. Annealing to relieve internal stress may be performed between steps where large reductions in diameter are required.

The neutron source material in an elongated form can be transferred to another location or retained until a particular strength neutron source is required. Then a length of neutron source material with a uniform dispersion of californium-252 can be cut from the supply and encapsulated to provide a neutron source of proportionate strength.

The following examples are presented to illustrate specific quantities and conditions relating to the neutron source material and the process used in its preparation. It will be clear to those skilled in the art that other materials, quantities and procedures might also be employed within the scope of the present invention.

EXAMPLE I

A uniform dispersion of about 1 atom percent of californium and cerium as $Cf_2O_3$ and $CeO_2$ in palladium is prepared beginning with palladium powder and a nitric acid solution of cerium and californium. About 28 cc of 0.1M $HNO_3$ and 0.15M $HCO_2H$ containing about 1 milligram of californium and 13 milligrams of cerium stand-in are admixed with about 1 gram of −325 U.S. Sieve Series mesh palladium powder in the following manner. About 2 cc of this solution is poured over the powder and evaporated to dryness at 80° C to 90° C. This procedure is repeated until all of the solution is added to the powder. The dried mixture is thoroughly blended to uniformity with a rotary stirring device. The blended powder is pressed at 15,000 psi in a die having a circular cross section to form a cylindrically shaped compact of about 50 percent theoretical density. Then the compact is heated in a 4 percent $H_2$-96 percent He gas atmosphere to 1,000° C on a ceramic tray coated with palladium powder to decompose the $Cf(NO_3)_3$ to $Cf_2O_3$. The temperature is raised to 1,300° C in an argon gas atmosphere and the compact sintered for about 1/2 hour to increase the density of the compact to in excess of about 95 percent of theoretical. The compact is sealed in a ⅜ inch outside diameter palladium sheath that snugly fits the diameter of the compact but has end space provided for elongation. The enclosed compact is cold swaged on a conventional rotary swaging machine to produce about 20 percent reduction in cross-sectional area. The clad compact is then annealed at 900° C for about 10 minutes in argon to relieve internal stress. Cold swaging is again performed to produce another 20 percent reduction in cross-sectional area followed by a second annealing step. Swaging and annealing are repetitively performed for 10 reduction steps to produce a 6 inch wire of about 0.025 inch diameter. By radiation monitoring methods it is found that the californium concentration does not vary over 10 percent throughout the length of the wire and that over 90 percent of the original californium is incorporated into the wire.

EXAMPLE II

A dispersion of about 5 atom percent samarium as a stand-in for californium with about 0.5 nanogram californium-252 tracer is dispersed in a palladium matrix in a similar manner to that described in Example I. After uniformly blending about −100 U.S. Sieve Series mesh palladium powder with samarium nitrate and californium nitrate, the mixture is pressed into a compact and heated to about 800° C to decompose the nitrate to the oxide. The compact is sintered in an argon atmosphere at about 1,300° C to near theoretical density. The compact is then formed into a 0.05 inch diameter wire on a conventional rolling mill by sequential rolling passes with about 20–40 percent cross-sectional area reduction during each pass. Intermediate annealing after each pass relieves internal stresses. The californium is found to be within about 2 percent uniformity along the length of the wire with 94 percent of the original californium incorporated in the wire product. The samarium stand-in is distributed within 8 percent uniformity at about 2 mg per inch throughout the length of the wire. By leaching the process vessels and tools with dilute nitric acid solution nearly 100 percent of the original californium is recovered.

It is expected that neutron source material can be prepared with up to about 10 atom percent californium without stand-in elements, however elements similar to those employed as stand-ins in the above examples may continue to be included in the neutron source material of the present development.

The present invention provides a neutron source material having a uniform dispersion of californium-252 such that it can be conveniently allotted into neutron sources of precise size and intensity. The material includes the californium in a matrix to prevent loss of this valuable radioisotope and contamination of the surroundings. Also a method is provided for preparing the source material with minimal loss of the radioisotope.

What is claimed is:

1. A californium-noble metal neutron source material consisting essentially of a palladium metal matrix with up to about 10 atom percent of californium-252 uniformly dispersed throughout said matrix.

2. The neutron source material of claim 1 wherein said material is in the form of an elongated member having a palladium metal cladding and a uniform dispersion of californium-252 throughout its length.

3. The neutron source material of claim 1 wherein said californium-252 is present in the form of californium oxide uniformly dispersed throughout said matrix.

4. The neutron source material of claim 1 wherein said californium-252 and said palladium metal matrix are an alloy.

* * * * *